United States Patent Office 3,065,220
Patented Nov. 20, 1962

3,065,220
PREPARATION AND USE OF ZIEGLER CATALYSTS WHEREIN THE CATALYST COMPONENTS ARE REACTED AT BELOW −25° C.
Robert J. McManimie, Harry G. Hurst, and Edward H. Mottus, Dayton, Ohio, assignors to Monsanto Chemical Company, St. Louis, Mo., a corporation of Delaware
No Drawing. Filed May 22, 1956, Ser. No. 586,353
6 Claims. (Cl. 260—94.9)

This invention relates to Ziegler catalysts. In one particular embodiment the invention relates to the preparation of Ziegler catalysts. In other embodiments, the invention relates to the use of Ziegler catalysts to effect chemical reactions, especially polymerizations. In certain preferred aspects the invention pertains to the production of high density polyethylene by polymerizing ethylene in the presence of a catalyst exemplified by the material obtained by the interaction of a trialkylaluminum with titanium tetrachloride, said catalyst having been prepared under specified conditions.

There has recently come into commercial prominence the polymerization of ethylene and other monomers through the agency of a type of catalyst advanced by Prof. Dr. Karl Ziegler of the Max Planck Institute at Mulheim, Ruhr, Germany. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of group IV–B, V–B or VI–B of the periodic system, including thorium and uranium, and especially compounds of titanium, zirconium and chromium. These, and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of groups IV–B, V–B or VI–B metals. Another Ziegler type catalyst is prepared by the interaction of an aluminum compound of the general formula $R_2AlX$ where R is a hydocarbon radical such as alkyl or aryl, and X is a halogen, such as chlorine or bromine, with a compound of a metal of group VIII of the periodic system, e.g., iron, nickel, cobalt, or platinum, or manganese, for example dimethylaluminum monobromide plus ferric chloride, diisobutylaluminum chloride plus nickel (trivalent) chloride, diethylaluminum monochloride plus manganic chloride. Yet another combination is that of the group IV–B, V–B or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethyl-aluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the group IV–B, V–B and VI–B heavy metals as previously mentioned, combined with the alkali metal alkyls, for example with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example butyl lithium plus zirconium tetrachloride, sodium tetramethylaluminum plus titanium tetrachloride or plus thorium acetylacetonate. Other Ziegler type catalysts are prepared by using (in conjunction with compounds of group IV–B, V–B and VI–B metals), instead of trialkylaluminums, triaryl-, triaralkyl-, trialkaryl- or mixed alkyl- and aryl- aluminum, zinc, magnesium or alkali metals, e.g., phenyl sodium plus $TiCl_4$.

Those skilled in the art having knowledge of these matters, refer to catalysts of the foregoing type as Ziegler or Ziegler-type catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the group IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Belgian Patent 538,782 issued jointly to Montecatini Societa Generale per L'Industria Mineraria e Chimica Anonima and Professor Dr. Karl Ziegler, disclosing the polymerization of olefins having at least 3 carbon atoms in the molecule, and their copolymerization with each other and with ethylene, using a variety of Ziegler catalysts; olefins, especially α-olefins, disclosed in said Belgian Patent 538,782 include propylene, butylene, isobutylene, pentylene, hexylene, vinyl cyclohexene and styrene. Substantially the same disclosure is found in Australian patent application 9651/55 also filed by Montecatini and Ziegler jointly. Catalysts of the said Belgian Patent 538,782 and Australian application 9651/55 are obtained by reaction of compounds of metals of the left-hand column of the 4th to 6th groups of the periodic table of elements, including the thorium and uranium groups, with metals, alloys, metal hydrides, or metal-organic compounds of metals of the 1st to 3rd groups of the periodic table.

It will be seen from the foregoing that a large variety of co-reactants can be employed which by interaction with each other result in the formation of a Ziegler catalyst. It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form although often in such finely divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid. The essence of the present invention, however, is not to be found in the particular Ziegler type catalyst employed but rather in the method used to prepare such catalyst, with consequent advantages when used to catalyze a variety of chemical reactions, polymerization of ethylenically unsaturated monomers being of particular interest.

Ziegler catalysts can be employed to catalyze a variety of chemical reactions, for example the chlorination of benzene to produce mono- and polychlorobenzenes, especially ortho- and para-dichlorobenzene. The reaction of most intense commercial interest at the present time is polymerization. The present invention is broadly applicable to all Ziegler catalysts, and their use in all chemical reactions catalyzed thereby, and insofar as polymerization is concerned is broadly applicable to all Ziegler type polymers, i.e., all polymers prepared by polymerizing a monomer or mixture of monomers in the presence of a Ziegler type catalyst. A monomer which can be so polymerized can properly be called a Ziegler-polymerizable monomer. Of especial interest, of course, are those Ziegler solid polymers of sufficiently high molecular weight to be useful in the plastics industry, but the benefits of the invention are obtainable in preparing lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für praktische Chemie, 2nd Series, vol. 158, page 136 (1941), and J.A.C.S., 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler type catalysts are also of great interest, having exceptional low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, vinylnaphthalene, vinyl aromatic hydrocarbons generally, etc. Styrene when polymerized in the presence of Ziegler type catalysts gives a high molecular weight polymer showing a crystalline structure by X-ray diffraction examination. Ziegler type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial No. 507,717, filed May 11, 1955. A variety of copolymers of the various monomers named above with each other and with other comonomers can be prepared by Ziegler catalysis, and the present invention in its broadest scope includes all such and in fact all polymers prepared through the agency of Ziegler type catalysts on any single monomer or mixture of monomers polymerizable with such catalysts. Despite the broad scope of the invention, it will be found more convenient in most of the present application to discuss the invention with specific reference to preferred embodiments thereof, and accordingly, Ziegler type polyethylene will be especially referred to by way of example. Likewise referred to especially by way of example will be catalysts prepared by the interaction of a trialkylaluminum with titanium tetrachloride, this being the preferred example of the preferred group of Ziegler catalysts which are those prepared by interaction of (a) an aluminum compound of the general formula $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium and zirconium.

Ziegler catalysts, for whatever use desired, can be prepared in the vessel in which the catalyzed reaction is to be carried out, or can be prepared in one vessel and then transferred to the intended reaction vessel, and in either event can either be used immediately after preparation, or after a period of time elapses between the preparation of the catalyst and its subsequent use to catalyze, e.g., polymerization. There are certain practical advantages in preparing a considerable quantity of a Ziegler catalyst, and then storing same and using the stored catalyst as a stock from which to draw portions thereof for use in a series of batch reactions or over an extended period of time in a continuous reaction. Not only is the number of catalyst preparations minimized, but uniformity in the ratio of the materials going into making the Ziegler catalyst is thus assured. Further, in effecting Ziegler polymerizations it has been found that preparation of the catalyst in the vessel in which the polymerization is to be conducted tends to result in more severe "plating" of polymer on the surfaces of the reaction vessel, heat exchange surfaces within the vessel, stirrers, and the like, than occurs when the catalyst is first prepared in a separate vessel and then a portion or all of the catalyst is transferred into the polymerization vessel for use. However, Ziegler catalysts on standing, i.e., during storage, tend to undergo certain changes, the nature of which is not well understood, but which result in various disadvantages. Possibly the most undesirable effect of storing or "aging" Ziegler catalysts is loss of catalytic activity. Another important effect is that aged catalyst tends to give polymer of higher molecular weight than does fresh catalyst, and this is usually not desired. These disadvantages can be minimized by storing Ziegler catalyst at temperatures below about 10° C., and preferably below about −25° C. for fairly long storage periods, as disclosed and claimed in the copending application entitled "Improvements in Use of Ziegler Catalysts," Serial No.

586,352, filed of even date herewith. When Ziegler catalyst prepared in accordance with the present invention is to be stored, it is preferably stored at below 10° C. as described in said copending application.

Another problem encountered in carrying out Ziegler-catalyzed reactions is lack of uniformity of catalyst activity over the course of a reaction period. Thus, in a standard test in which ethylene is polymerized over a period of 12 minutes, which test is used to determine the activity of a given Ziegler catalyst preparation, usually the activity of the catalyst is found to vary very importantly even during this short period of time, as evidenced by the rate of polymerization reaching a peak and then dropping away during the stated time period. Unevenness in catalyst activity during a reaction results in variations in the required rate of heat transfer and thus either tends to overload the equipment or extra heat exchange capacity must be provided. In view of the fine particle size of Ziegler catalysts, and possibly due to chemical combination of part or all of the catalyst with reaction products, it is necessary to remove catalyst residues from polymer or other reaction product. In case of polymers this is conveniently accomplished by thorough intermingling of the total reaction mixture at the end of the polymerization period with an alcohol, preferably a lower aliphatic alcohol such as methanol, ethanol, n-propanol, i-propanol, iso-butanol, n-butanol, sec.-butanol, tert.-butanol, the amyl alcohols, hexyl alcohols, and the like. For efficient catalyst removal, it is usually necessary to increase the temperature for this contacting with alcohol to relatively high values, such as 95° C. In the usual case, effecting the contact with alcohol at the more convenient temperatures in the neighborhood of room temperature up to say 50 to 60° C. is ineffective in giving adequate catalyst removal. This usually results in the recovery of a final polymer product which has either poor initial color or poor color on being subjected to thermal processing, i.e., poor color thermal stability. It should be mentioned that for optimum results, it is extremely important to avoid contact of oxygen or moisture with the polymer until it has been thoroughly contacted with alcohol and preferably until the first portion of alcohol used has been separated from the polymer and the polymer has been adequately washed with subsequent portions of alcohol or other solvents, e.g., hexane.

In accordance with the present invention, one or more of the undesirable effects set forth in the immediately preceding paragraph, the particular effects varying somewhat from case to case, are reduced or completely obviated by preparing Ziegler catalyst at temperatures below about minus 25° C. The principal, but not necessarily the only, desirable results obtained by the practice of the invention can be summarized as follows. When the Ziegler catalyst is preperad at temperatures below −25° C., no large agglomerates are visible in the preparation. When prepared in exactly the same manner but at higher temperatures, for example at 0° C. on up through room temperature and above, agglomerates may be formed. The catalyst prepared below −25° C. has a more uniform activity, exhibited for instance when employed for polymerizing a Ziegler polymerizable monomer, the uniformity being with respect to time, than the conventional Ziegler catalyst. For example, when subjected to a standard test for catalyst activity, wherein ethylene is polymerized over a 12-minute period, the rate of polymerization is approximately constant during the 12-minute period when catalyst prepared below −25° C. is employed. Ordinary Ziegler catalysts show a sharp rise in rate of polymerization, follower by a rapid fall. While polymer prepared by Ziegler catalysis cannot ordinarily be effectively separated from catalyst residues by treatment with a lower alkanol, e.g., isobutyl alcohol, at temperatures within the range of 25 to 50° C., if Ziegler catalyst prepared under exactly the same conditions but at temperatures below −25° C. is substituted, the removal of catalyst residues by said alkanol at said temperatures is more effective. Thus, with a given Ziegler polymer perpared under given conditions in order to obtain a given good initial color, the "quench" temperature, i.e., temperature at which the polymer is first contacted with isobutanol, must be above 65° C., e.g., 95° C., if conventional Ziegler catalyst is used, but can be lower, say 50° C. on down to room temperature, if Ziegler catalyst prepared below −25° C. is used.

More detailed information will now be given on preferred procedures and components for preparing various Ziegler catalysts. We prefer catalysts prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium, tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.1:1 to 10:1 on up to 15:1 or higher. It is generally preferred to use an Al:Ti mol ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances it is also advantageous to prepare the catalyst in the presence of a monomer; for example if the catalyst is prepared in the presence of monomeric styrene, and then used to polymerize styrene, a high proportion of crystalline polystyrene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents.

The amount of catalyst required is dependent on the other variables of the particular reaction, such as the polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.003:1.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is well to protect the catalyst during preparation, storage, and use by blanketing with an inert gas, e.g., nitrogen, argon or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

The polymer will be recovered from the total reaction mixture by a wide variety of procedures, chosen in accordance with the properties of the particular polymer, the presence or absence of solvent and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts.

In order to illustrate some of the various aspects and advantages of the invention, the following examples are given. It will of course be understood that variations from the particular catalyst components, reactants, solvents, proportions, temperatures and the like can be made without departing from the invention.

EXAMPLES

Ziegler catalyst was prepared in the same vessel in which ethylene was later polymerized in the presence of the catalyst. The vessel was a glass resin pot provided with a jacket for temperature control, and fitted with a paddled stirrer which revolved in the center of the reactor, a thermowell for temperature determination, gas inlet and outlet tubes, a liquid addition port, and a dip tube for polymer transfer. Water or ethylene glycol was circulated through the jacket for control of temperature, this fluid being either cooled or heated as necessary. For temperatures approaching 100° C., atmospheric pressure steam was passed through the jacket. For temperatures below room temperature, the reaction pot was immersed in a mixture of solid $CO_2$ and acetone.

Before each run the apparatus was cleaned, baked dry, assembled and flushed with lamp grade nitrogen. Catalyst and polymerization reaction mixture were protected from any contact with air at all times.

In preparing catalyst at room temperature the requisite amount of triisobutylaluminum was added to a portion of the total volume of kerosene to be used and maintained in the reactor at room temperature. While agitating, the requisite amount of $TiCl_4$ was then added in a portion of the kerosene. The small remaining portion of the kerosene was used to rinse the catalyst components into the reactor. The resulting catalyst suspension was then aged at room temperature for about an hour. In the preparation of catalyst at low temperatures, a similar procedure was used, modified as follows. The triisobutylaluminum-kerosene solution was cooled to below −40° C. by surrounding the reaction flask in a Dry Ice-acetone bath. The requisite amount of $TiCl_4$ was then dissolved in the remaining kerosene and added to the reactor with agitation. The cooling bath was then removed, and after aging for about an hour without application of heat, circulating water in the jacket was used to bring the catalyst-kerosene mixture to reaction temperature.

In most instances, the catalyst components were employed in amounts providing 0.6 gram total catalyst components (triisobutylaluminum plus $TiCl_4$) per 100 ml. kerosene. The kerosene used had been highly purified by extensive acid washing. The mole ratio of aluminum to titanium was in most instances 0.4. The values thus given apply to Runs A and B in the tables below. Table I gives these values and the corresponding values for the other runs in Table II.

Table I

| Run No. | Mole Ratio, Al/Ti | Concentration,[1] Wt./Vol. (Percent) |
|---|---|---|
| A | 0.4 | 0.6 |
| B | 0.4 | 0.6 |
| C | 0.5 | 0.4 |
| D | 1.0 | 3.4 |
| E | 0.5 | 0.4 |
| F | 2.3 | 1.0 |

[1] Grams total catalyst components per 100 ml. kerosene.

The ratios and concentrations in runs A, B, C and E were essentially the same so as to avoid effects of variation in ratio and concentration. The ratio and concentration for runs D and F differed because of the higher concentration and ratios necessary to secure an active catalyst.

As soon as reaction temperature was attained, the flow of ethylene below the surface of the liquid was started, with the stirrer in operation. During the exothermic polymerization of ethylene to high molecular weight high density polyethylene, the temperature was maintained at about 65–70° C. by flow of cooling liquid through the jacket.

Immediately after the polymerization, and without exposure to air, a series of aliquots of each polymer were "quenched" with isobutanol at varying temperatures to determine the minimum "quenching" temperature which would result in immediate discharge of color from the polymer to produce a white polymer.

It was found that catalysts prepared at below −40° C. gave a polymer from which the brown color could be discharged by isobutanol at room temperature. In contrast, catalyst prepared with the same components but at room temperature gave polymers whose brown color could be discharged with isobutanol only by heating to above 85° C. Further, the kerosene-isobutanol filtrate or "quenched" mother liquor was clear blue in the first instance, but muddy amber in the second. Additionally, the polymers prepared with the low temperature catalyst retain the good color provided they are withheld from contact with air until thoroughly washed with hot isobutanol after the quenching. A polymer so treated which is then milled and compression molded at 170° C. has an excellent color, and this color is often appreciably better than that of polymer prepared in the same manner but with catalyst made at room temperature.

Certain catalysts have been found which permit quenching at somewhat lower temperatures than are required for polymer obtained with the trialkylaluminum/$TiCl_4$ catalyst. Catalyst prepared at room temperature, in the manner described above, from diisobutylaluminum hydride and $TiCl_4$ had good activity, and the quench liquor was clear blue like that obtained when using the trialkylaluminum/$TiCl_4$ catalyst prepared at below −40° C., but the minimum quench temperature to give white polymer was 60–65° C. However, the other catalysts, all of which contained either an aluminum-oxygen or a titanium-oxygen bond, and prepared in the manner described above, had greatly reduced polymerization activity, as compared to the triisobutylaluminum/$TiCl_4$ catalyst. It will be noted that the latter catalyst had the highest minimum quench temperature (>85° C.) to produce white polymer particles, but that when the catalyst was prepared at below −40° C. rather than at room temperature it was possible to quench the polymer at room temperature (<35° C.)

Table II

| Run | Catalyst | Prep'n Temp., °C. | Minimum Quench Temp. to Produce White Polymer Particles, °C. | Color of Quench Mother Liquor | Catalyst Activity |
|---|---|---|---|---|---|
| A | Al(i-Bu)$_3$  TiCl$_4$ | ca 25 | >85 | amber | good. |
| B | Al(i-Bu)$_3$  TiCl$_4$ | <−40 | <35 | blue | good. |
| C | AlH(i-Bu)$_2$  TiCl$_4$ | ca 25 | 60-65 | blue | good. |
| D | Al(i-Bu)$_3$  TiCl$_3$OBu | ca 25 | <60-65 | amber | fair. |
| E | Al(i-Bu)$_3$+O$_2$  TiCl$_4$ | ca 25 | <60-65 | amber | fair. |
| F | Al(i-Bu)$_2$(OCOBu)  TiCl$_4$ | ca 25 | <60-65 | amber | fair. |

Bu=butyl.

While the invention has been described with particular reference to preferred embodiments thereof, it will be appreciated that variations from the details given herein can be effected without departing from the invention in its broadest aspects.

We claim:

1. Method which comprises interacting below −25° C. (a) an aluminum compound of the general formula R$_2$AlX wherein R is selected from the group consisting of alkyl, cycloalkyl and aryl radicals and X is selected from the group consisting of hydrogen, halogen, and alkyl, cycloalkyl and aryl radicals, with (b) a metal halide selected from the group consisting of the chlorides, bromides and iodides of titanium and zirconium, to form an active catalyst, the mol ratio of (a) to (b) being between 0.3:1 and 5:1.

2. Method which comprises polymerizing, in contact with a catalyst prepared by interacting below −25° C. (a) an aluminum compound of the general formula R$_2$AlX, wherein R is selected from the group consisting of alkyl, cycloalkyl and aryl radicals and X is selected from the group consisting of hydrogen, halogen, and alkyl, cycloalkyl and aryl radicals, with (b) a metal halide selected from the group consisting of the chlorides, bromides and iodides of titanium and zirconium, to form an active catalyst the mol ratio of (a) to (b) being between 0.3:1 and 5:1, an ethylenically unsaturated monomer polymerizable thereby.

3. Method according to claim 2 wherein said monomer is ethylene.

4. Method according to claim 2 wherein said catalyst is prepared as a dispersion in an inert hydrocarbon liquid and wherein ethylene as said monomer is polymerized in contact with said dispersion.

5. Method which comprises interacting below −25° C. a trialkylaluminum with titanium tetrachloride to form an active catalyst, the mol ratio of aluminum to titanium being between 0.3:1 and 5:1.

6. Method which comprises polymerizing, in contact with a catalyst prepared by interacting below −25° C. a trialkylaluminum with titanium tetrachloride to form an active catalyst, the mol ratio of aluminum to titanium being between 0.3:1 and 5:1, an ethylenically unsaturated monomer polymerizable thereby.

References Cited in the file of this patent

UNITED STATES PATENTS

| | | |
|---|---|---|
| 1,473,543 | Clancy | Nov. 6, 1923 |
| 1,914,558 | Craver | June 20, 1933 |
| 2,691,647 | Field et al. | Oct. 12, 1954 |
| 2,710,854 | Seelig | June 14, 1955 |
| 2,781,410 | Ziegler | Feb. 12, 1957 |
| 2,874,153 | Bowman et al. | Feb. 17, 1959 |

FOREIGN PATENTS

| | | |
|---|---|---|
| 534,362 | Belgium | Jan. 31, 1955 |
| 544,462 | Belgium | May 16, 1955 |
| 538,782 | Belgium | Dec. 6, 1955 |